(12) United States Patent  
Park

(10) Patent No.: US 6,650,359 B1
(45) Date of Patent: Nov. 18, 2003

(54) AUDIO-VISUAL RECORDING APPARATUS FOR VEHICLES

(76) Inventor: Hayle Park, 4176 Arch Dr. #313, Studio City, CA (US) 91604

( * ) Notice: Subject to any disclaimer, the term of this patent is extended or adjusted under 35 U.S.C. 154(b) by 0 days.

(21) Appl. No.: 09/267,917

(22) Filed: Mar. 2, 1999

(51) Int. Cl.$^7$ ................................. H04N 7/18
(52) U.S. Cl. ..................................... 348/148
(58) Field of Search ............................ 348/148; 455/99; 340/438; 307/10.5; 180/287; H04N 7/18

(56) References Cited

U.S. PATENT DOCUMENTS

| | | | |
|---|---|---|---|
| 4,843,463 A | | 6/1989 | Michetti |
| 5,027,104 A | | 6/1991 | Reid |
| 5,408,330 A | | 4/1995 | Sqicciarini et al. |
| 5,568,211 A | | 10/1996 | Bamford |
| 5,570,127 A | | 10/1996 | Schmidt |
| 5,612,578 A | * | 3/1997 | Drew ........................ 307/10.5 |
| 5,646,994 A | * | 7/1997 | Hill ............................ 348/148 |
| 5,677,979 A | | 10/1997 | Squicciarini et al. |
| 5,680,123 A | | 10/1997 | Lee |
| 5,706,909 A | * | 1/1998 | Bevins et al. ................ 180/287 |
| 5,825,283 A | * | 10/1998 | Camhi ........................ 340/438 |
| 6,154,658 A | * | 11/2000 | Caci ............................. 455/99 |

* cited by examiner

*Primary Examiner*—Young Lee
(74) *Attorney, Agent, or Firm*—Stephen J. Koundakjian; Charles W. Fallow

(57) ABSTRACT

A system for acquiring and recording audio, visual and other information, relating to the condition or environment of a motor vehicle, and for storing the information at the vehicle for playback and analysis. The system is activated by the "on" status of the engine, or by the "alert" status of an alarm system if present. A camera may be used to acquire visual data, and a microphone may be used to acquire audio data. Other types of data—e.g., speed; date and time; or confirmation of braking—can likewise be acquired by conventional sensing devices. Acquired visual, audio and other data may be recorded in a solid-state device, such as a flash card or F-RAM. Data is continuously and sequentially overwritten until the system is deactivated. Playback may be accomplished through a computer or television set.

14 Claims, 10 Drawing Sheets

Fig. 2
Fig. 3
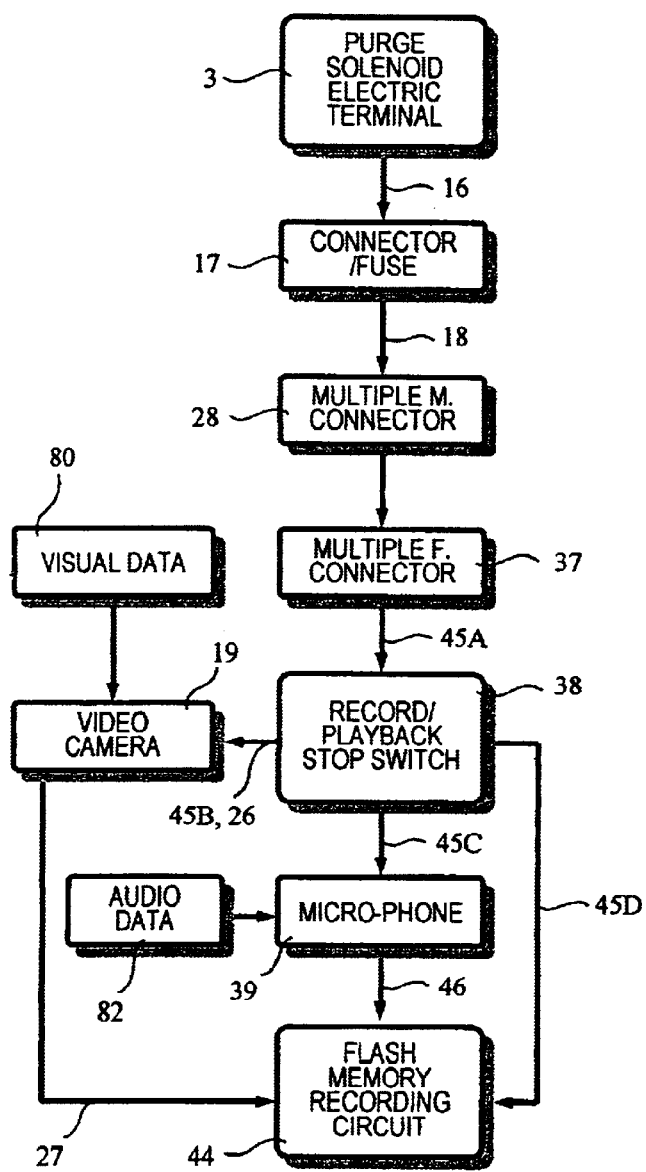
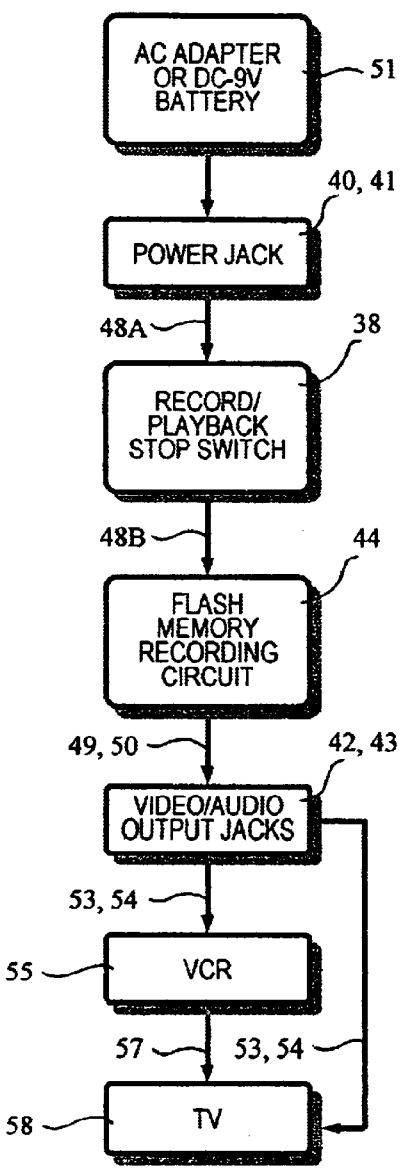

AUDIO-VISUAL RECORDING APPARATUS FOR VEHICLES

RELATED ART

U.S. Pat. No. 5,568,211 of Bamford, dated Oct. 22, 1996; U.S. Pat. No. 5,027,104 of Reid, dated Jun. 25, 1991; U.S. Pat. No. 5,408,330 of Squicciarini et al., dated Apr. 18, 1995; U.S. Pat. No. 5,677,979 of Squicciarini, dated Oct. 14, 1997; U.S. Pat. No. 5,680,123 of Lee, dated Oct. 21, 1997; U.S. Pat. No. 5,570,127 of Schmidt, dated Oct. 29, 1996; and U.S. Pat. No. 4,843,463 of Michetti, dated Jun. 27, 1989.

BACKGROUND OF THE INVENTION

1. Field of the Invention

This invention relates generally to cameras and recording devices, and more specifically to cameras and recording devices used to acquire visual and audio data during operation of a vehicle, and importantly, to record events related to vehicle accidents.

2. Description of Related Art

Automobiles are the most common form of transportation in the United States, and unfortunately accidents do occur. In most of the automobile accidents that occur the cause of the accident is generally disputed or unknown. Knowing the cause of the accident is critical as the damages associated with the resulting medical treatment and automobile repair can be very expensive.

Although in many cases there are eye witnesses to the accident for several reasons their testimony is not always reliable. First, the eye witnesses closest to the action are typically the drivers involved in the accident. Of course, these witnesses testimony can be biased due to the potential liability they might incur, or they can be injured and as a result not remember the accident or the events leading up to it. Second, the drivers of other automobiles in the vicinity of the accident that have witnessed the accident generally do not stop to report what they have seen.

Due to the high cost of medical care and car repair, there is a high incentive on the part of the driver at fault to incorrectly report the cause of the accident. As a result of the problems associated with eye witness testimony, several devices have been developed to provide a means of determining the cause of an accident.

U.S. Pat. No. 4,843,463 of Michetti discloses an audio-visual trip recorder. This device records the audio-visual data on to a video tape cassette. The use of a video tape cassette requires that the cassette be continuously changed or rewound at the end of the tape. This device is activated and deactivated by the automobile's ignition switch. Although relying on the ignition switch is fairly effective when the recording device is a video cassette, it is a problem if another type of recording medium is used. For example, some recording mediums record for a set period of time and then after the set period has expired, the old visual data is overwritten with the new incoming visual data.

From the preceding descriptions, it is apparent that the devices currently being used have significant disadvantages. Thus important aspects of the technology used in the field of invention remain amenable to useful refinement.

SUMMARY OF THE INVENTION

The present invention further refines the existing art. In its first preferred embodiment, the invention is an apparatus for obtaining and storing audio and visual data for use with a vehicle having an engine and an alarm system. The engine having a status of either operating or not operating, and the alarm system having a status of either alerting or not alerting. The invention includes means, which are responsive to the status of the engine, for activating and deactivating the apparatus. It also includes means for gathering the visual data inside and outside the vehicle. It further includes means for continuously recording the visual and audio data.

The foregoing is a description of the first preferred embodiment of the invention in its broadest or most general form. Even in this general form, however, it can be seen that this invention significantly mitigates the difficulties left unresolved in the art.

In particular, the invention allows for continuous recording of visual and audio data without requiring the user to replace or rewind a video cassette. Thus, the user can essentially forget that the apparatus is there until the user wants to retrieve the recorded and stored data.

Having a medium upon which audio and visual data are continuously being recorded requires that the apparatus stop recording immediately after an accident. Other inventors have connected their systems to the vehicle's ignition switch, and when that switch is on the system is recording. This is generally not a problem if the recording meduim is a video cassette that stops recording when the cassette tape has ended. This, however, is a problem if the recording medium is continuously recording by overwriting previously acquired visual and audio data. With this type of system, the data of the accident could be overwritten as a result of the vehicle's ignition switch being on.

Therefore, the invention here does not record data depending on whether the ignition switch is in the on position or not, instead, the apparatus records the information only when the engine is operating. This is effective because the more recently produced automobiles have a mechanism whereby the engine shuts off in the event of an accident. Thus, the invention stops recording when the engine is not operating, which prevents the apparatus from overwriting the data of the accident.

Although this embodiment in its broad form represents a significant advance in the art, it is preferably practiced in conjunction with certain other features or characteristics that further enhance the invention's overall benefits.

For example, it is preferred that the gathering means include a camera and the recording means include a flash memory recording circuit. It is also preferred that the invention further include some means for acquiring the audio data inside and outside the vehicle, and some means for manually deactivating the apparatus. It is further preferred that the invention include some means, which are responsive to the alarm system, for turning-on and turning-off the apparatus, as well as the alarm system.

In its second preferred embodiment the invention is an apparatus for obtaining and storing audio and visual data for use with a vehicle having an engine and an alarm system. The engine having a status of either operating or not operating, and the alarm system having a status of either alerting or not alerting. The apparatus includes some means, which are responsive to the status of the engine, for activating and deactivating the apparatus. It also includes a camera, for gathering the visual data inside and outside the vehicle, as well as a flash memory recording circuit for continuously recording the visual data and audio data.

The foregoing is a description of the second preferred embodiment of the invention in its broadest or most general form. Even in this general form, however, it can be seen that this invention significantly mitigates the difficulties left unresolved in the prior art.

In particular, the flash memory recording circuit continuously records the visual data gathered by the camera on a preset time interval. If the time interval were preset for five minutes, then after five minutes of data had been recorded, the new data would be recorded over the old data. Thus, the recording circuit is continuously recording without having to replace a recording medium, as is required with a video cassette, and the flash memory chip always has five minutes of data stored.

Although this embodiment in its broad form represents a significant advance in the art, it is preferably practiced in conjunction with certain other features or characteristics that further enhance the invention's overall benefits.

For example, it is preferred that the invention further includes a microphone for acquiring the audio data inside and outside the vehicle, and a button for manually deactivating the apparatus. It is also preferred that the invention include some means, which are responsive to the status of the alarm system, for turning-on and turning-off the apparatus. It is further preferred that the invention include the alarm system.

Also preferred is that the flash memory recording circuit include some means for reviewing the recorded audio data and visual data. Further preferred is that the reviewing means include a television.

In its third preferred embodiment the invention is an apparatus for obtaining and storing audio and visual data for use with a vehicle having an engine and an alarm system. The engine having a status of either operating or not operating, and the alarm system having a status of either alerting or not alerting. The apparatus includes some means, which are responsive to the status of the engine, for activating and deactivating the apparatus. It also includes some means, which are responsive to the status of the alarm system, for turning-on and turning-off the apparatus. Further included is a camera for gathering the visual data inside and outside the vehicle, and a microphone for acquiring the audio data inside and outside the vehicle. Lastly, the invention includes a flash memory recording circuit for continuously recording the visual data and audio data, whereby the recording is terminated by the deactivation of the apparatus when the engine is not operating and the visual and audio data are stored in the flash memory recording circuit. The flash memory semi-conductor recording circuit includes some means for reviewing the recorded audio data and visual data.

The foregoing is a description of the third preferred embodiment of the invention in its broadest or most general form. Even in this general form, however, it can be seen that this invention significantly mitigates the difficulties left unresolved in the prior art.

In particular, the recording of data is initiated by either the operating of the engine or the alerting of the alarm system. Thus, the apparatus can record the events before and during an automobile accident, as well as during a breach of security of the automobile, such as vandalism or theft.

Although this embodiment in its broad form represents a significant advance in the art, it is preferably practiced in conjunction with certain other features or characteristics that further enhance the invention's overall benefits.

For example, it is preferred that the reviewing means include a television. It is also preferred that the activating and deactivating means include either a purge solenoid electric terminal, a power steering pressure switch, or an alternator combined with a voltage regulator. It is further preferred that the invention include the alarm system.

All of the foregoing operational principles and advantages of the present invention will be more fully appreciate upon consideration of the following detailed description, with reference to the appended drawings.

BRIEF DESCRIPTION OF THE DRAWINGS

FIG. 2 is a flow chart depicting the recording process having one camera;

FIG. 3 is a flow chart depicting the reviewing process;

DESCRIPTION OF THE PREFERRED EMBODIMENTS

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Figure 1:
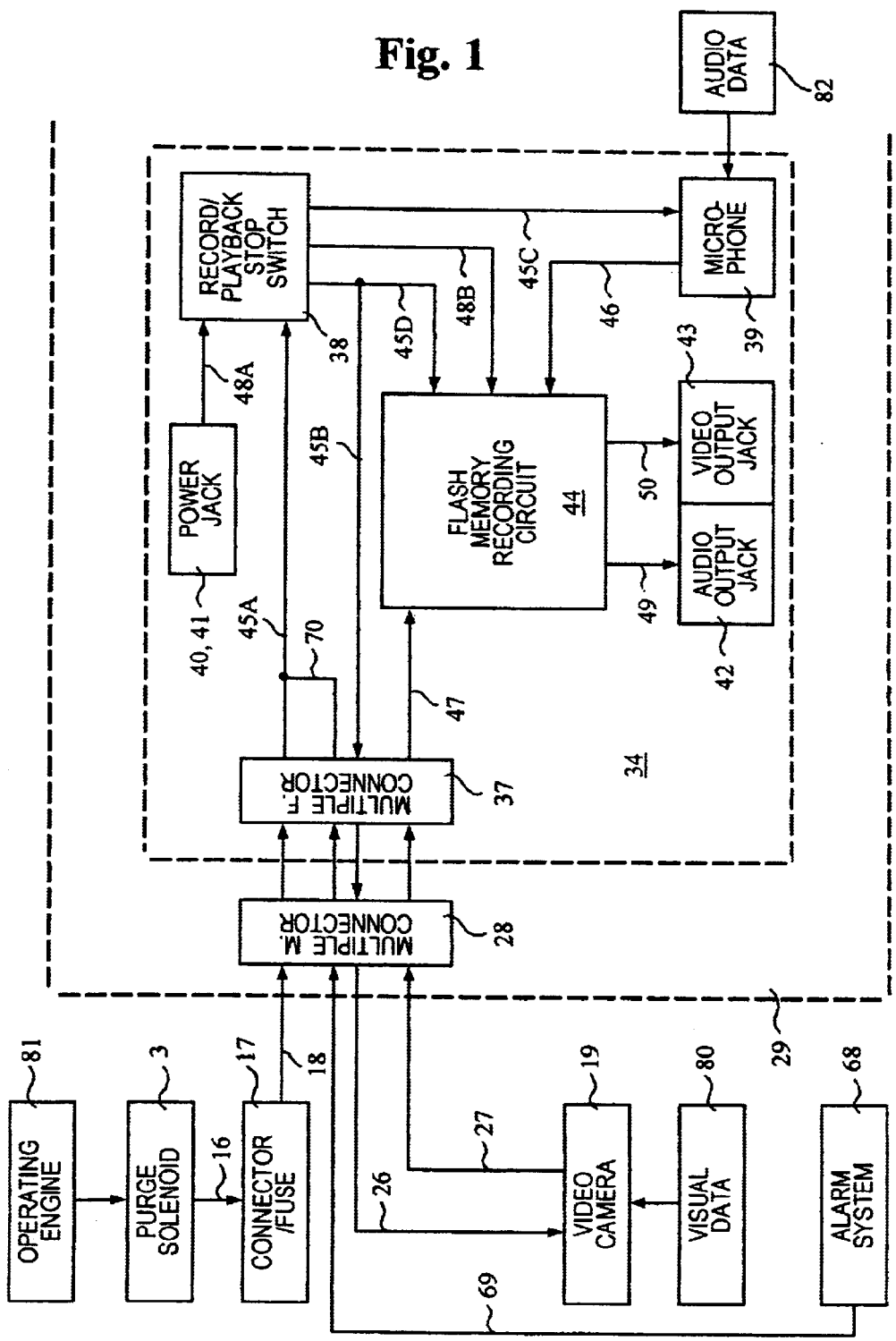
FIG. 1 is a block diagram of the apparatus.
Figure 4:
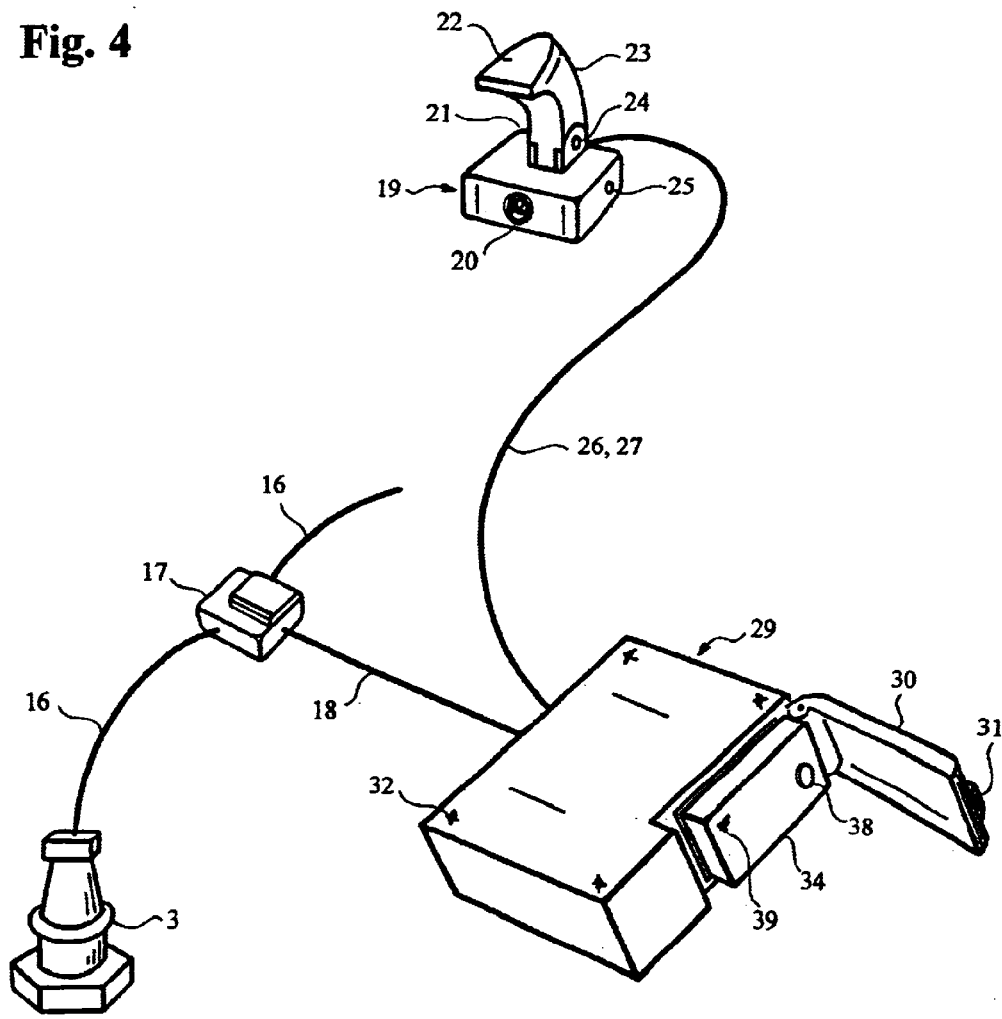
FIG. 4 is a perspective view of the apparatus.

A preferred embodiment of my invention provides a purge solenoid electric terminal 3 (FIGS. 1 and 2) which is powered as a result of the operating engine 81. The purge solenoid electric terminal transfers 16 power through a connector 17 having a fuse. The fuse connector transfers 18 power to a multiple male connector 28 which is an integral part of the rack 29. The alarm system 68 can also transfers 69 power to the multiple male connector 28 when the alarm system is alerting because the alarm system is being powered by the vehicle's battery when it is alerting. The multiple male connector is connected to a multiple female connector 37 of the recording unit 34. Power is transferred 45a to a switch 38 having a record and playback mode. From the switch 38, power flows to several different elements of the apparatus. The power flows 45b from the switch through the multiple female connector 37 and the multiple male connector 28, then the power flows 26 to the video camera 19 which gathers the visual data 80. The power also flows 45*d* to the flash memory recording circuit 44, and it flows 45*c* to the microphone 39 as well.

Once powered, the apparatus begins collecting data. The video camera 19 gathers visual data 80, transfers 27 the data through the multiple connectors 28 and 37, and then transfers 47 the data to the flash memory recording circuit 44 to be recorded. The microphone 39 gathers audio data 82, and transfers 46 the data to the flash memory recording circuit 44 to be recorded.

Figure 17:
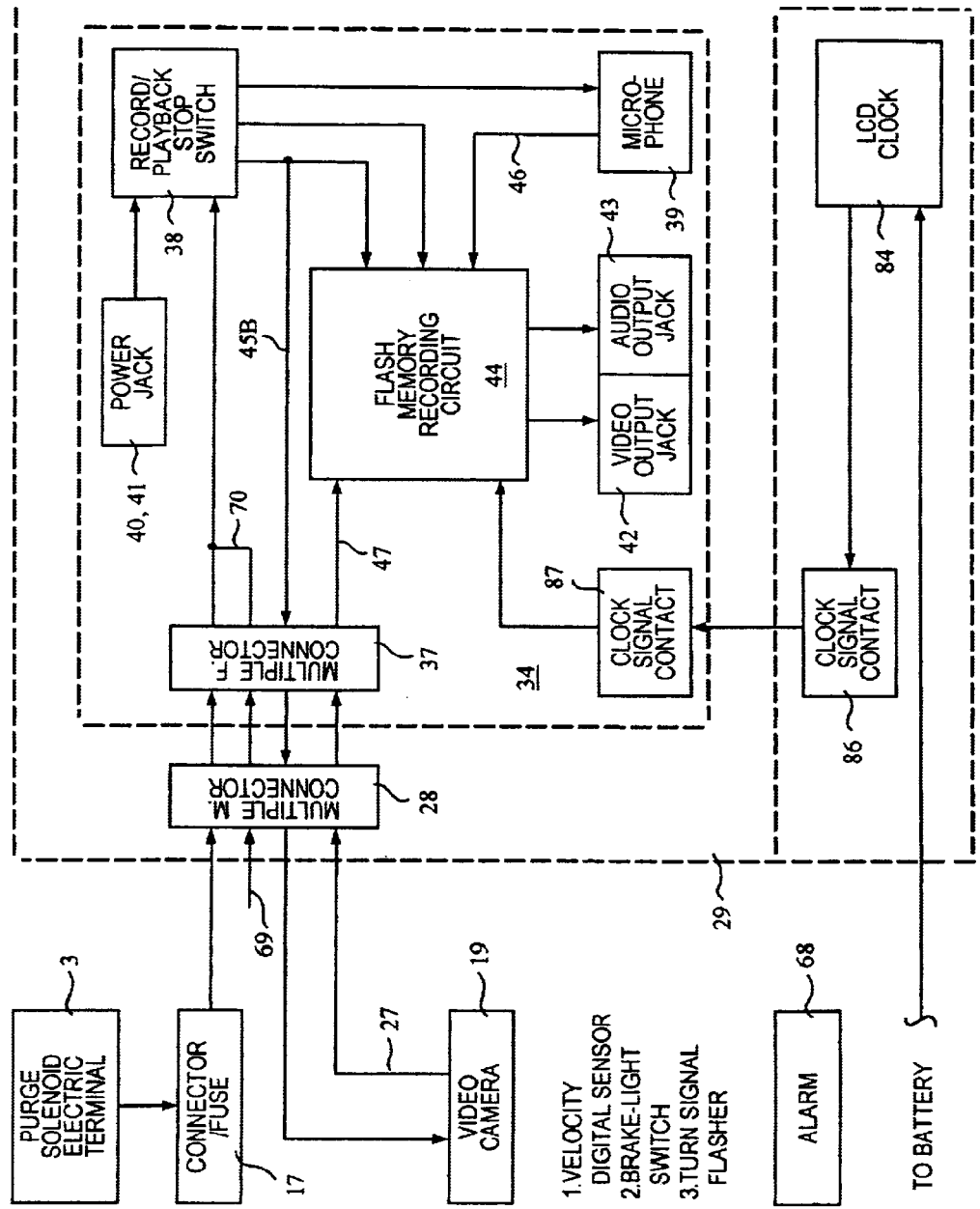
FIG. 17 is a block diagram showing how the vehicle's clock is connected to the flash memory recording circuit.

Additional data can also be collected, for instance, time. Time is recorded by connecting the clock 84 (FIG. 17) of the rack 29 to the flash memory recording circuit 44 through two clock signal contacts 86 and 87 in the rack 29 and recording unit 34 respectively. In a similar manner, the velocity of the vehicle can be recorded by connecting a digital velocity sensor to the flash memory recording circuit. Whether the brakes were applied can be recorded by connecting the brakelight switch wire to the flash memory recording circuit. Also, whether a turn signal was engaged can be recorded by connecting the turn signal flasher wires to the flash memory recording circuit.

Figure 12:
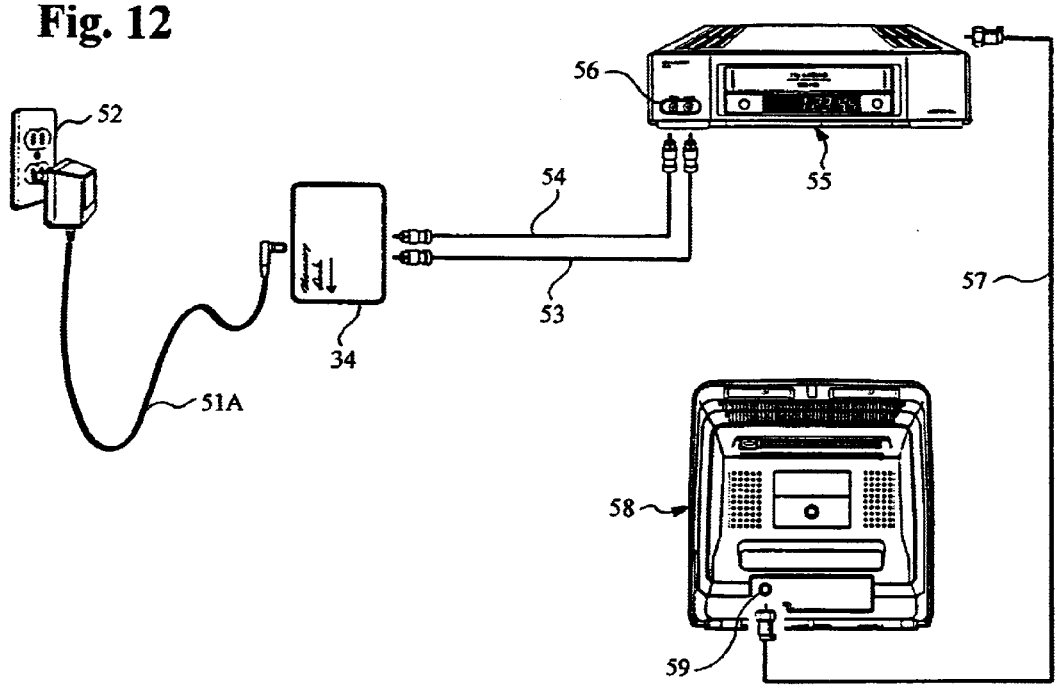
FIG. 12 is an illustration of the reviewing means.
Figure 13:
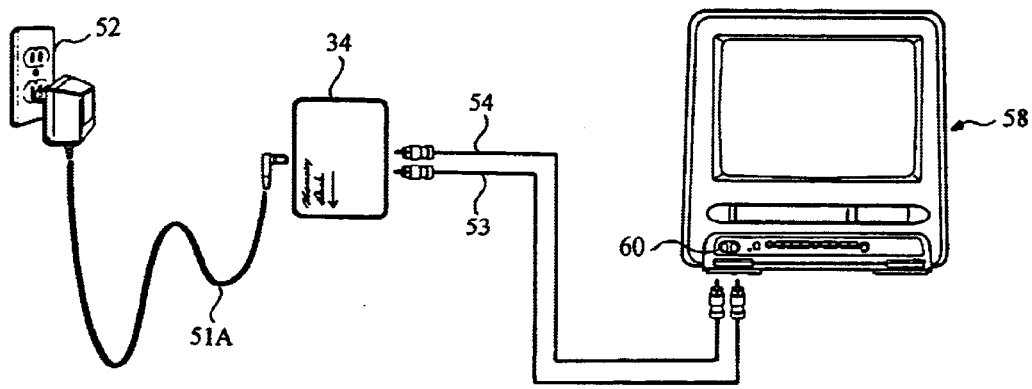
FIG. 13 is an illustration of the reviewing means.

The recording unit 34 has a playback mode so that the recorded data may be reviewed (FIGS. 3, 12, and 13). The power supply 51 transfers power through the power jacks 40 or 41, depending on whether the power supply is AC or DC. The power flows 48*a* through the switch 38, then flows 48*b* to the flash memory recording circuit 44. Once the recording circuit is powered the audio data and visual data can be reviewed. From the flash memory circuit the visual data flows 50 through the video output jack 43 of the recording unit to a video input jack on a video cassette recorder (VCR) or directly in to a television.

Figure 5:
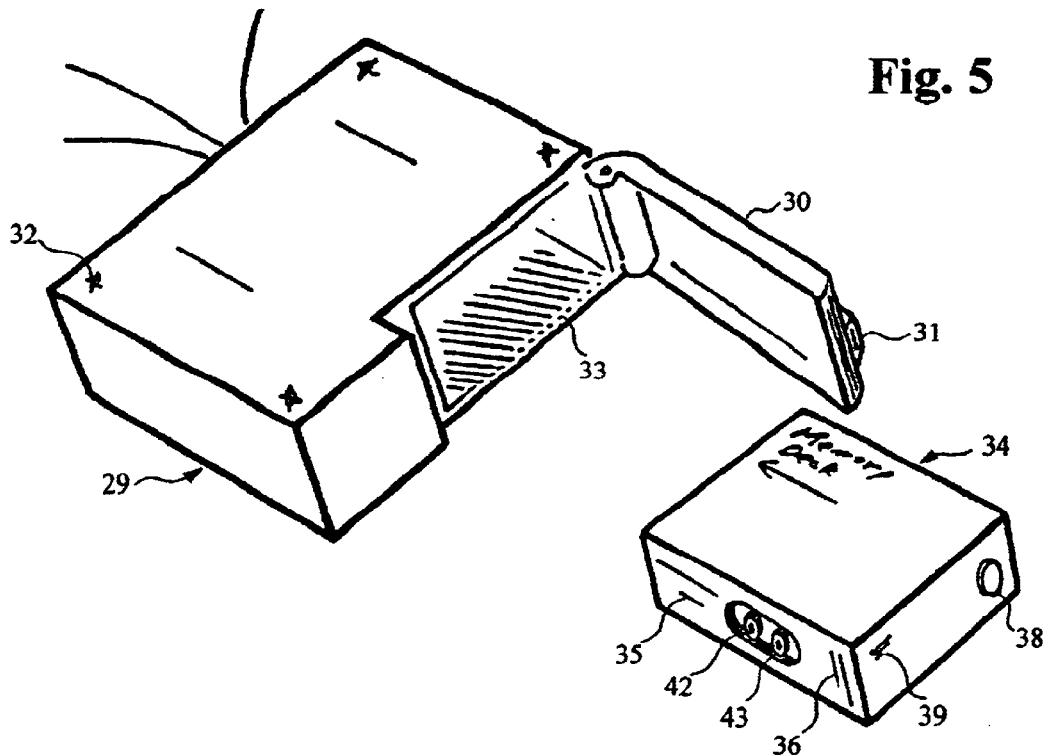
FIG. 5 is a perspective view of the rack and recording unit.
Figure 6:
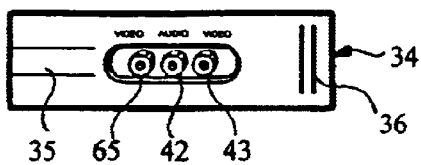
FIG. 6 is an isometric view of the left side of the recording unit showing the video and audio output jacks.
Figure 7:
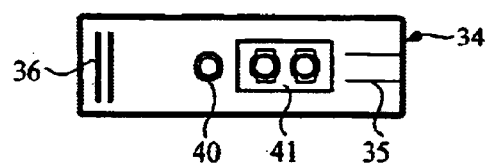
FIG. 7 is an isometric view of the right side of the recording unit showing the power jacks for the reviewing process.
Figure 8:
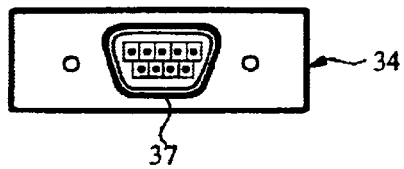
FIG. 8 is an isometric view of the back side of the recording unit showing the multiple female connector.
Figure 9:
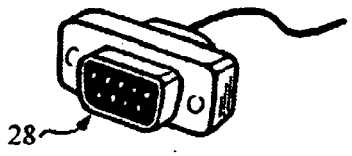
FIG. 9 is perspective view of a multiple male connector, which is part of the rack.

The recording unit 34 slides into the rack 29 (FIG. 5). The recording unit has guide rails 35 to align the multiple male and female connectors. The recording unit also has grips 36 to aid in the removal of the recording unit from the rack. Video jacks 43 and 65 (FIG. 6) and an audio jack 42, for reviewing the stored audio and visual data, are located on one side of the recording unit 34. On the opposite side of the recording unit 34 (FIG. 7) are the power jacks used to connect the recording unit to a source of power. The back side of the recording unit (FIG. 8) is where the multiple female connector 37 is located, which connects with the multiple male connector 28 (FIG. 9).

Figure 10:
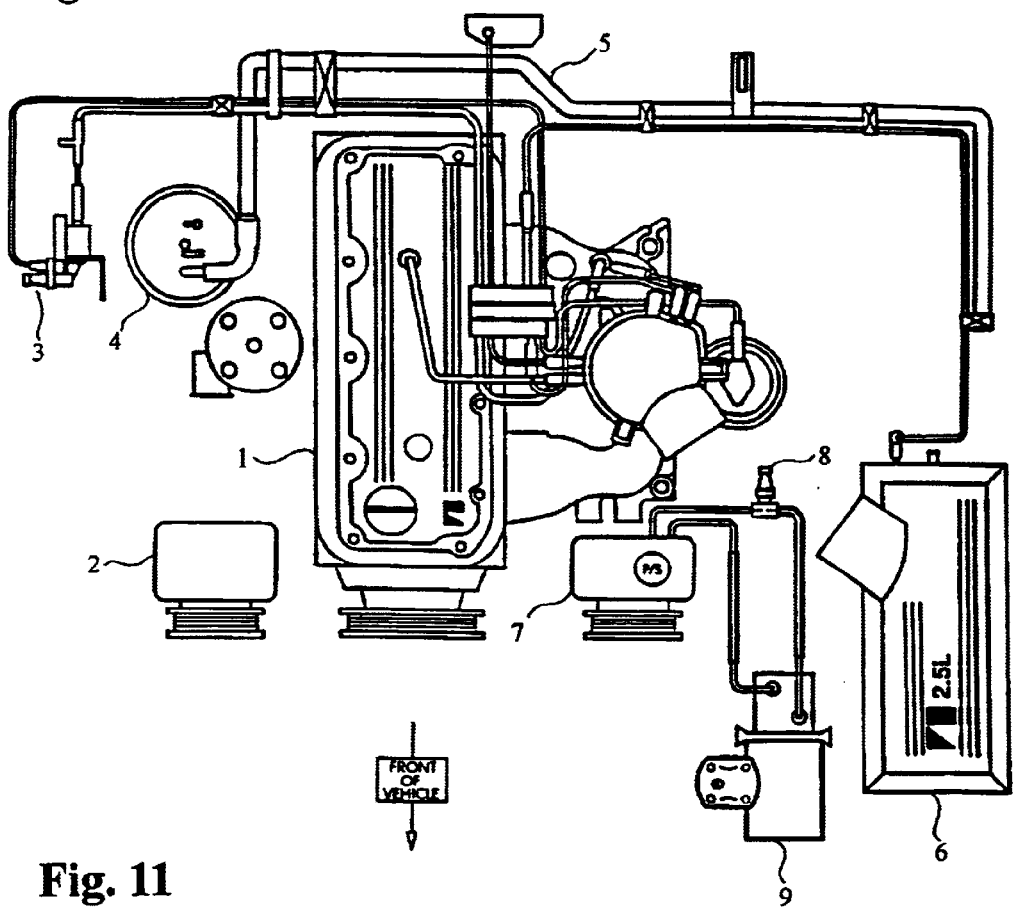
FIG. 10 is an isometric view of an automobile engine.
Figure 11:
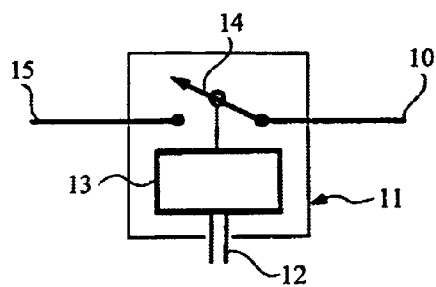
FIG. 11 is a diagram of an automatic on/off switch.

Another embodiment of the invention includes using other parts of the engine, besides the purge solenoid electric terminal, to supply power to the apparatus. For example, the power steering pressure switch 8 (FIG. 10) can be used to supply the necessary power. Also, an alternator 2 used in conjunction with a voltage regulator can supply the power. Due to the fact that some automobiles cannot have the apparatus connected to the engine as discussed above, an alternative set up (FIG. 11) uses a switch 14 connected to the vacuum tube assembly 5 via a vacuum line 12 and a vacuum valve 13. The switch connects the car battery 10 to the apparatus, thus supplying power to the apparatus when the vacuum valve pulls the switch closed. The vacuum only functions when the engine is operating and therefore, this configuration powers the apparatus only when the engine is operating.

Figure 14:
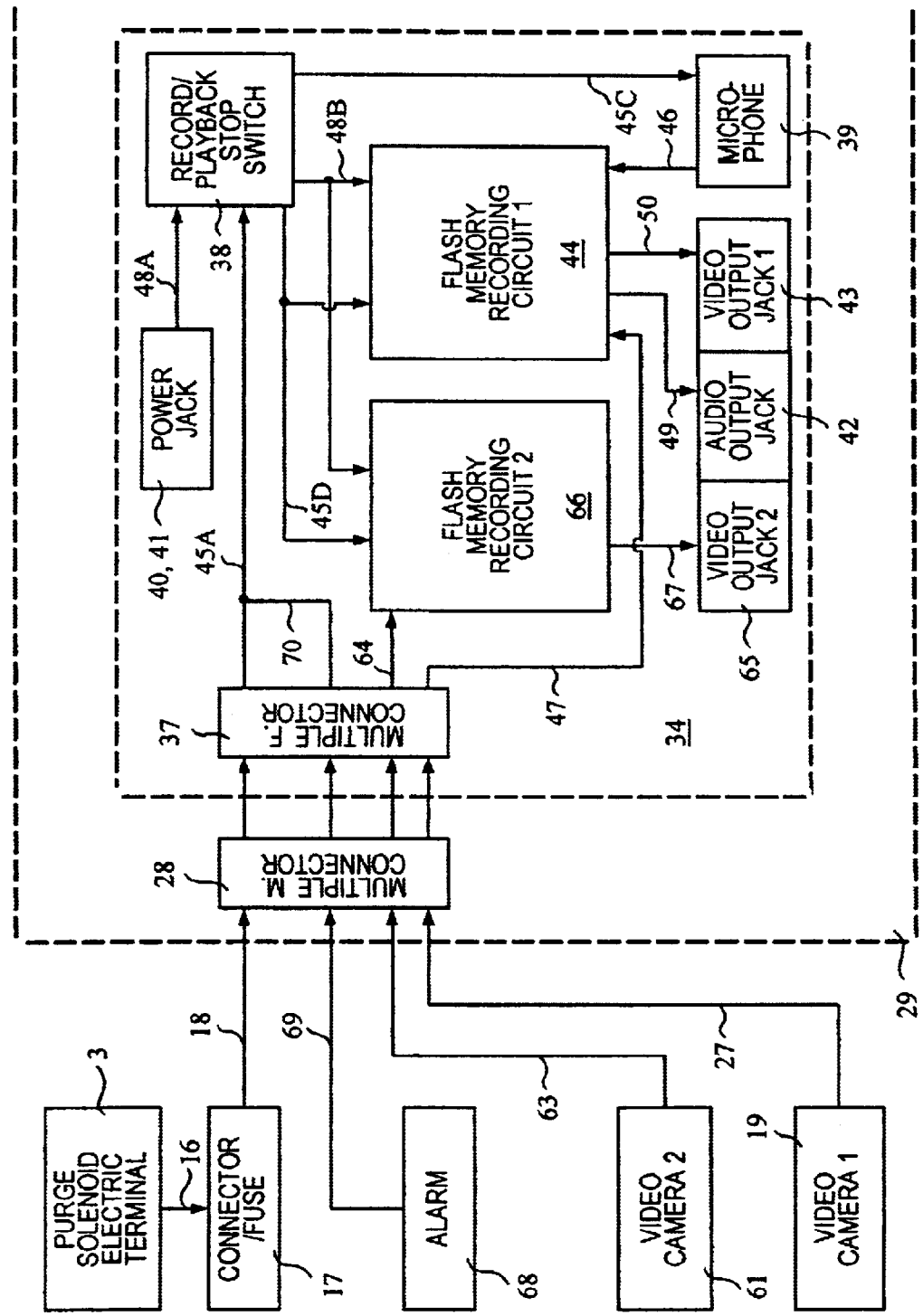
FIG. 14 is a block diagram showing the apparatus having two cameras.
Figure 15:
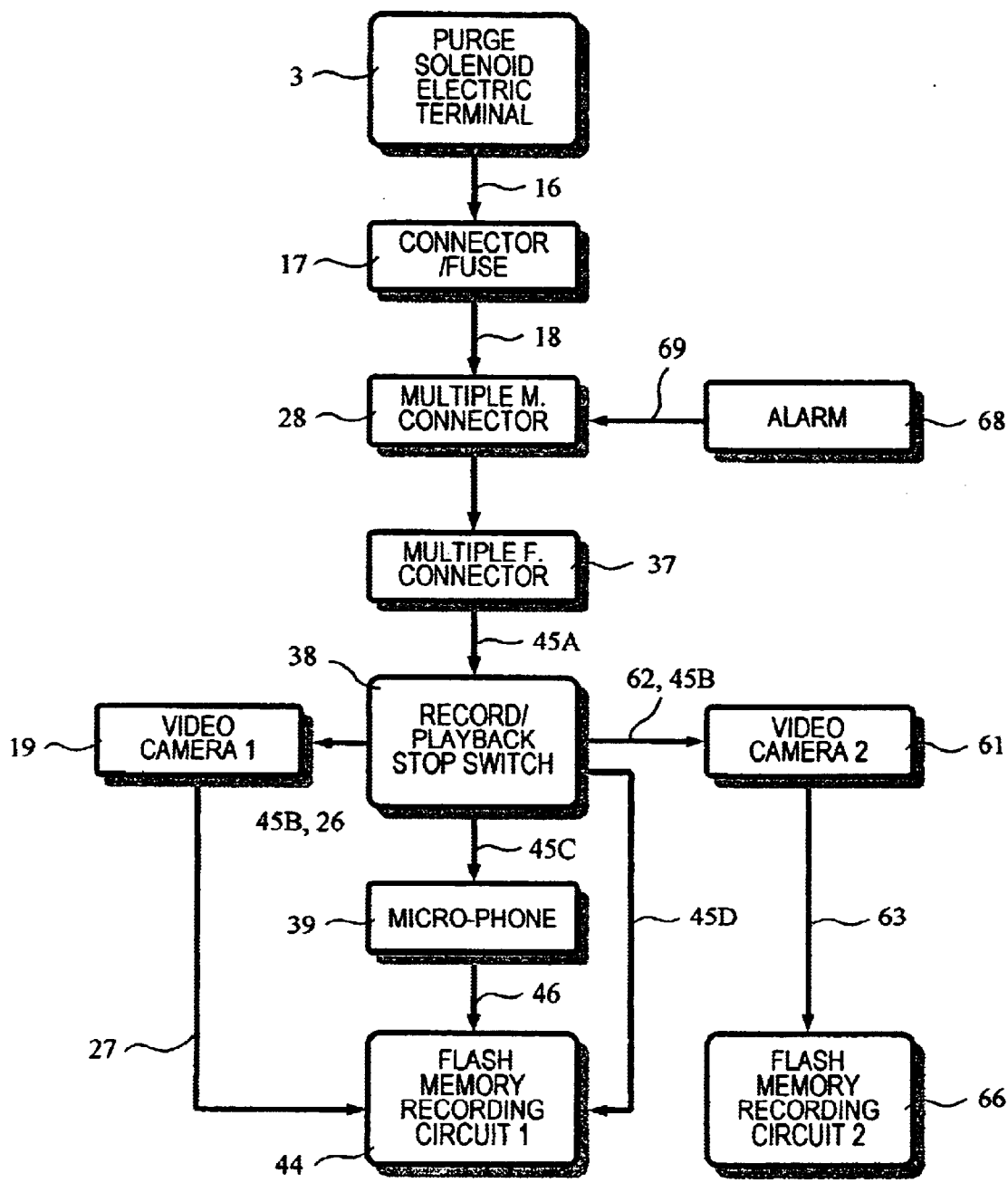
FIG. 15 is a block diagram showing the recording process having two cameras.
Figure 16:
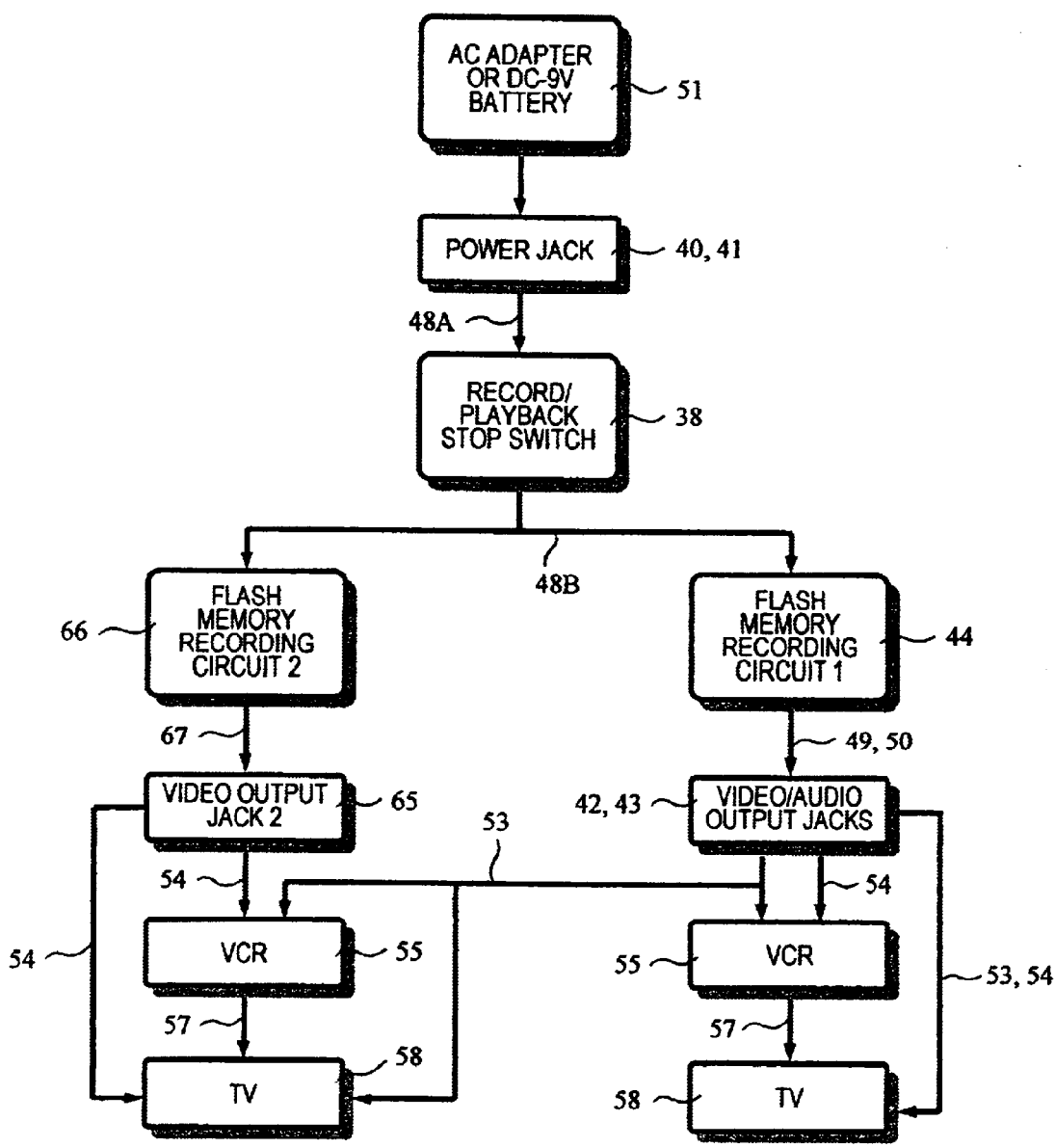
FIG. 16 is a block diagram showing the reviewing process of an apparatus having two cameras.

Another preferred embodiment of the invention applies the same discussion as the first preferred embodiment with some differences (FIG. 14). This embodiment includes the use of a first and a second video cameras 19 and 61. It also includes a first flash memory recording circuit 44 and a second flash memory recording circuit 66 for recording and storing the data collected from the first and second video cameras. The elements of this embodiment are interconnected in essentially the same manner as the first embodiment.

I claim:

1. Apparatus for obtaining and recording visual data relating to a vehicle having an engine, the engine having a status of either operating or not operating; a battery for supplying electrical energy to the engine; a selectively controllable ignition switch, the ignition switch having a closed position permitting the flow of electrical energy from the battery to the engine, and an open position preventing the flow of electrical energy from the battery to the engine; said apparatus comprising:

shutoff means for changing the status of the engine from operating to not operating, independently of the ignition switch position, independently of any signal generated externally to the vehicle and without the necessity of any operator intervention;

activation means responsive to said status of the engine for activating the apparatus when the engine is in its operating status, and for deactivating the apparatus when the ignition switch is closed and the shutoff means changes the status of the engine from operating to not operating;

visual data gathering means, responsive to the activation means, for gathering the visual data; and recording means, at the vehicle and responsive to the visual data gathering means, for continuously recording and sequentially over-writing the visual data.

2. The apparatus of claim 1, wherein the visual data gathering means comprises camera means and the recording means records the visual data while the apparatus is activated.

3. The apparatus of claim 1, wherein the recording means comprises a solid state recording circuit.

4. The apparatus of claim 1, further comprising audio data gathering means, responsive to the activation means, for acquiring audio data.

5. The apparatus of claim 1, further comprising means for selectively deactivating the apparatus.

6. The apparatus of claim 1, wherein the visual data gathering means is configured to obtain visual data outside the vehicle.

7. The apparatus of claim 1, wherein the visual data gathering means is configured to obtain visual data inside the vehicle.

8. The apparatus of claim 4, wherein the audio data gathering means is configured to obtain audio data relating to at least one mechanical component of the vehicle.

9. The apparatus of claim 4, wherein the audio data gathering means is configured to obtain audio data outside the vehicle.

10. The apparatus of claim 4, wherein the audio data gathering means is configured to obtain audio data outside and inside the vehicle.

11. Apparatus for obtaining and recording visual data relating to a vehicle having an engine, the engine having a status of either operating or not operating; a battery for supplying electrical energy to the engine; a selectively controllable ignition switch, the ignition switch having a closed position permitting the flow of electrical energy from the battery to the engine, and an open position preventing the flow of electrical energy from the battery to the engine; said apparatus comprising:

shutoff means for changing the status of the engine from operating to not operating, independently of the ignition switch position, independently of any signal generated externally to the vehicle and without the necessity of any operator intervention;

activation means responsive to said status of the engine for activating the apparatus when the engine is in its operating status, and for deactivating the apparatus when the ignition switch is closed and the shutoff means changes the status of the engine from operating to not operating;

a camera, connected to the activation means, for gathering the visual data outside the vehicle; and a recording circuit at the vehicle, connected to the camera, for continuously recording and sequentially over-writing the visual data on a solid state device.

12. The apparatus of claim 11, further comprising a microphone, connected to the activating and deactivating means, for acquiring audio data, the recording circuit connected to the microphone, for continuously recording the audio data and sequentially over-writing audio data previously recorded on the solid state device.

13. The apparatus of claim 11, further comprising means to selectively deactivate the apparatus.

14. Apparatus for obtaining and recording visual data relating to a vehicle having an engine with a vacuum line and a battery transmitting electrical energy to the engine when the electrical circuit between the battery and the engine is closed, the engine having a status of either operating or not operating, said apparatus comprising:

shutoff means for changing the status of the engine from operating to not operating, independently of any signal generated externally to the vehicle and without the necessity of any operator intervention;

activation means, responsive to said status of the engine, for activating and deactivating the apparatus;

visual data gathering means, responsive to the activation means, for gathering the visual data;

recording means, at the vehicle and responsive to the visual data gathering means, for continuously recording and sequentially over-writing the visual data; and a switch electrically intervening between the battery and the activation means, the switch permitting transmission of electrical power from the battery to the activation means only when the switch is closed, the switch being closed only when a vacuum is present in the car engine vacuum line, the activation means being responsive to said status of the engine by electrical power passing through the switch, closure of said switch occurring in response to the not operating status of the engine and without the necessity of operator intervention or any externally-generated signal.

* * * * *